United States Patent
Völcker et al.

(10) Patent No.: US 12,506,617 B2
(45) Date of Patent: Dec. 23, 2025

(54) VALIDATION OF SIGNATURES OF A VIDEO STREAM ENCODED IN LAYERS

(71) Applicant: Axis AB, Lund (SE)

(72) Inventors: Björn Völcker, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 252 days.

(21) Appl. No.: 18/358,207

(22) Filed: Jul. 25, 2023

(65) Prior Publication Data
US 2024/0048394 A1 Feb. 8, 2024

(30) Foreign Application Priority Data
Aug. 1, 2022 (EP) .................................... 22188027

(51) Int. Cl.
| | | |
|---|---|---|
| *H04L 9/32* | (2006.01) | |
| *H04L 9/06* | (2006.01) | |
| *H04L 9/30* | (2006.01) | |
| *H04N 19/172* | (2014.01) | |
| *H04N 19/177* | (2014.01) | |
| *H04N 19/184* | (2014.01) | |
| *H04N 19/187* | (2014.01) | |

(52) U.S. Cl.
CPC ............ *H04L 9/3247* (2013.01); *H04L 9/065* (2013.01); *H04L 9/3073* (2013.01); *H04N 19/172* (2014.11); *H04N 19/177* (2014.11); *H04N 19/184* (2014.11); *H04N 19/187* (2014.11)

(58) Field of Classification Search
None
See application file for complete search history.

(56) References Cited

U.S. PATENT DOCUMENTS

| | | | |
|---|---|---|---|
| 2004/0066793 A1* | 4/2004 | Van Der Schaar | .... H04N 19/17 375/E7.182 |
| 2004/0091111 A1* | 5/2004 | Levy | .................. H04N 1/32144 705/58 |
| 2006/0136728 A1 | 6/2006 | Gentry et al. | |

(Continued)

FOREIGN PATENT DOCUMENTS

| | | | |
|---|---|---|---|
| CN | 107172431 A | 9/2017 | |
| EP | 3968635 A1 | 3/2022 | |
| WO | WO-2005017809 A2 * | 2/2005 | ........... H04L 9/3242 |

OTHER PUBLICATIONS

Extended European Search Report dated Jan. 13, 2023 for European Patent Application No. 22188027.1.

(Continued)

*Primary Examiner* — William J. Goodchild
(74) *Attorney, Agent, or Firm* — Volpe Koenig

(57) ABSTRACT

There is provided techniques for providing digital signatures to a video stream encoded in layers. Each layer comprises encoded image frames. A digital signature for layer k=0 is provided by providing by generating signing data for layer k=0 and generating the digital signature for layer k=0. A respective digital signature for each layer k=1, . . . , K−1 is provided by, for each layer k=1, . . . , K−1 generating signing data, and generating the digital signature for layer k by encrypting the signing data, or a hash thereof, for layer k with the private key of the private-public key pair. The digital signatures for all the layers are provide to the video stream.

10 Claims, 6 Drawing Sheets

(56) References Cited

U.S. PATENT DOCUMENTS

2007/0220260 A1 9/2007 King
2014/0010366 A1 1/2014 Quinn et al.

OTHER PUBLICATIONS

Mokhtarian et al., "Authentication of Scalable Video Streams with Low Communication Overhead," in IEEE Transactions on Multimedia, vol. 12, No. 7, pp. 730-742, Nov. 2010.
Hefeeda et al., "Authentication schemes for multimedia streams: Quantitative analysis and comparison," ACM Trans. Multimedia Comput. Commun. Appl. 6, 1, Article 6 (Feb. 2010), 24 pages.
Ma et al, "Authentication of Scalable Video Coding Streams Based on Topological Sort on Decoding Dependency Graph," in IEEE Access, vol. 5, pp. 16847-16857, 2017.
Zhao et al., "Technique for authenticating H.264/SVC and its performance evaluation over wireless mobile networks," Journal of Computer and System Sciences, vol. 80, Issue 3, 2014, pp. 520-532.
Ueda et al., "NAL Level Stream Authentication for H.264/AVC," IPSJ Journal, 2007, vol. 3 pp. 55-63.

\* cited by examiner

VALIDATION OF SIGNATURES OF A VIDEO STREAM ENCODED IN LAYERS

TECHNICAL FIELD

Embodiments presented herein relate to a method, a transmitter, a computer program, and a computer program product for providing digital signatures to a video stream encoded in layers. Embodiments presented herein further relate to a method, a receiver, a computer program, and a computer program product for validating the digital signatures of the video stream encoded in layers.

BACKGROUND

The use of video surveillance is steadily increasing, and with it comes issues related to storage of encoded video streams. Video streams of decent quality, even when encoded using a compression efficient encoding scheme, consumes storage space, both locally in a surveillance camera as well as in centralized storage (such as cloud storage). Storage space is always associated with a cost. An encoded video stream often needs to be stored until 1) it has been reviewed and deemed unimportant, or 2) the time period during which it could have been relevant has passed. For some installations, the time period in question may be set by legislation. One general rule often applied is to store the encoded video streams as long as possible, and once there is no more storage space available some kind of pruning scheme is therefore applied. Pruning here refers to the process of removing video frames, or video sequences, from an encoded video stream with the purpose of reducing a file size, and in some technical descriptions it is referred to as thinning. Inevitably, the removal of video frames, or video sequences, from an encoded video stream results in that the encoded video stream is regarded as tampered with. Removal of video frames, or video sequences, might further be unintentional. Another example is where pruning, or other types of malicious tampering with the encoded video stream, is performed by an adversary party. The purposes of such malicious tampering might be to remove video frames, or video sequences, containing information that is disadvantageous to the adversary party. Pruning is thus one example where encoded video streams are tampered with.

The ability to precisely identify a tampered encoded frame, or to identify where an encoded frame has been removed, is thus important not only in the context of pruning but also for identifying other types of tampering.

Many video security systems implement forms of watermarking at a source; however, these watermarking techniques can be easily defeated. As noted in US 2014/0010366 A1, without a comprehensive video security system, fraudulent video can become common and pose a significant dilemma for security personnel, network administrators, and corporate managers alike. Protocols should be developed to verify that video has not been tampered with since its generation at its source.

In US 2014/0010366 A1 is therefore disclosed a system and a method for providing cryptographic video verification. Two documents are generated. A first document comprises hashes from all frames in one or more group of pictures (GOPs). A second document comprises only hashes from I-frames of a set of GOPs. The documents can each be signed by the private key of the camera before the documents are communicated over a network. When video is thinned/pruned by removing P- and B-frames, the second document can be used to verify the I-frames.

However, as soon as P- or B-frames are pruned, only the second document is of relevance. This means that only the I-frames can be trusted and should be rendered. If the GOP-length is, say, 2 seconds, and all the P- or B-frames are pruned this means that one I-frame is transmitted per 2 seconds and thus that the framerate drops to 0.5 frames/second. Much information can be lost in a video sequence, when after pruning it is 2 seconds between two frames to be rendered. One possible remedy for this loss of information is to change the GOP format used such that I-frames are encoded more often and thus also sent more often. However, this increases the bitrate significantly. There is therefore a need for improved cryptographic video verification.

SUMMARY

An object of embodiments herein is to enable validation of a video stream encoded in layers.

According to a first aspect there is presented a method for providing digital signatures to a video stream encoded in layers $k=0, \ldots, K-1$. Each of the K layers is composed of encoded image frames. The method is performed by a transmitter. The transmitter has access to a private-public key pair. The method comprises providing a digital signature for layer $k=0$ by generating signing data for layer $k=0$ by hashing the encoded image frames of layer $k=0$, and generating the digital signature for layer $k=0$ by encrypting the signing data, or a hash thereof, for layer $k=0$ with a private key of the private-public key pair. The method comprises providing a respective digital signature for each layer $k=1, \ldots, K-1$ by, for each layer $k=1, \ldots, K-1$ generating signing data for layer $k$ by hashing the encoded image frames of layer $k$ and a link to any layer $k=0$ to layer $k-1$ on which layer $k$ is dependent, and generating the digital signature for layer $k$ by encrypting the signing data, or a hash thereof, for layer $k$ with the private key of the private-public key pair. The method comprises providing the digital signatures for all the K layers to the video stream.

According to a second aspect there is presented a transmitter for providing digital signatures to a video stream encoded in layers $k=0, \ldots, K-1$. Each of the K layers is composed of encoded image frames. The transmitter has access to a private-public key pair. The transmitter comprises processing circuitry. The processing circuitry is configured to cause the transmitter to provide a digital signature for layer $k=0$ by generating signing data for layer $k=0$ by hashing the encoded image frames (220a) of layer $k=0$, and generating the digital signature for layer $k=0$ by encrypting the signing data, or a hash thereof, for layer $k=0$ with a private key of the private-public key pair. The processing circuitry is configured to cause the transmitter to provide a respective digital signature for each layer $k=1, \ldots, K-1$ by, for each layer $k=1, \ldots, K-1$ generating signing data for layer $k$ by hashing the encoded image frames of layer $k$ and a link to any layer $k=0$ to layer $k-1$ on which layer $k$ is dependent. The processing circuitry is configured to cause the transmitter to generate the digital signature for layer $k$ by encrypting the signing data, or a hash thereof, for layer $k$ with the private key of the private-public key pair. The processing circuitry is configured to cause the transmitter to provide the digital signatures for all the K layers to the video stream.

According to a third aspect there is presented a computer program for providing digital signatures to a video stream encoded in layers, the computer program comprising computer program code which, when run on processing circuitry of a transmitter, causes the transmitter to perform a method according to the first aspect.

According to a fourth aspect there is presented a method for validating digital signatures of a video stream encoded in layers k=0, ..., K−1. Each of the K layers is composed of encoded image frames. The method is performed by a receiver. The receiver has access to a public key of a private-public key pair of a transmitter. The method comprises validating a digital signature for layer k=0 by verifying that signing data of the encoded image frames of layer k=0 matches a decrypted digital signature for layer k=0. The decrypted digital signature for layer k=0 is decrypted from the digital signature for layer k=0 using the public key. The method comprises validating a respective digital signature for layer k=1, ..., K−1 by, for layer k=1, ..., K−1, verifying that signing data of the encoded image frames of layer k and a link to any layer k=0 to layer k−1 on which layer k is dependent matches a decrypted digital signature for layer k. The decrypted digital signature for layer k is decrypted from the digital signature for layer k using the public key.

According to a fifth aspect there is presented a receiver for validating digital signatures of a video stream encoded in layers k=0, ..., K−1. Each of the K layers is composed of encoded image frames. The receiver has access to a public key of a private-public key pair of a transmitter. The receiver comprises processing circuitry. The processing circuitry is configured to cause the receiver to validate a digital signature for layer k=0 by verifying that signing data of the encoded image frames of layer k=0 matches a decrypted digital signature for layer k=0. The decrypted digital signature for layer k=0 is decrypted from the digital signature for layer k=0 using the public key. The processing circuitry is configured to cause the receiver to validate a respective digital signature for layer k=1, ..., K−1 by, for layer k=1, ..., K−1, verifying that signing data of the encoded image frames of layer k and a link to any layer k=0 to layer k−1 on which layer k is dependent matches a decrypted digital signature for layer k. The decrypted digital signature for layer k being decrypted from the digital signature for layer k using the public key.

According to a sixth aspect there is presented a computer program for validating digital signatures of a video stream encoded in layers, the computer program comprising computer program code which, when run on processing circuitry of a receiver, causes the receiver to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously, these aspects enable validation of a video stream encoded in layers.

Advantageously, these aspects enable a video stream composed of several layers to be validated by the receiver, independently of how many of the layers that the receiver receives.

Advantageously, these aspects allow for different layers in the video stream to be successively removed, whilst still enabling validation of the layers that are still kept.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
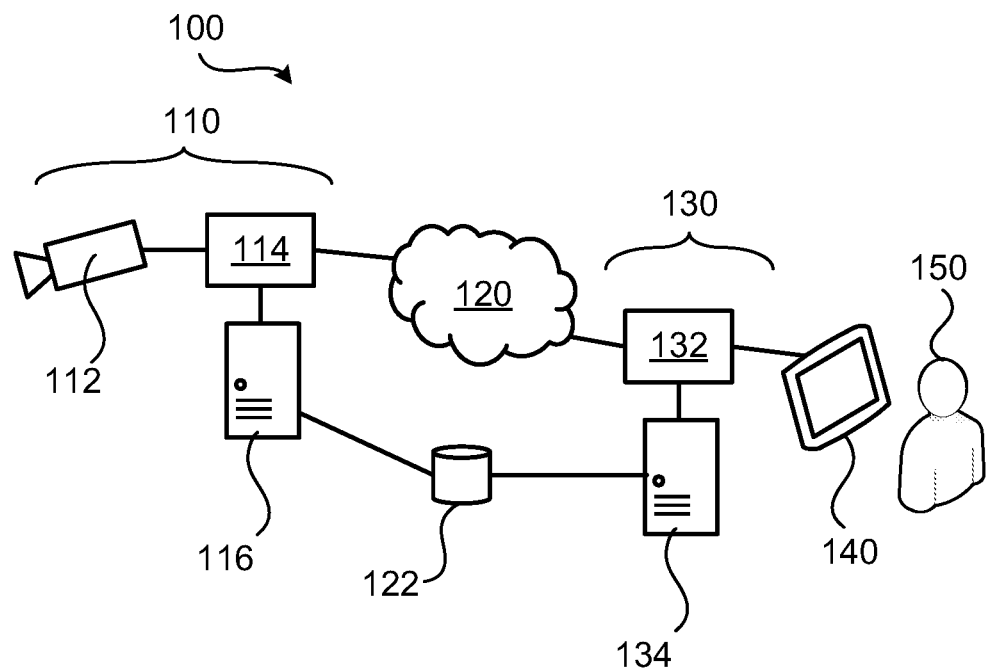
FIG. 1 schematically illustrates a system according to embodiments.

FIG. 1 is a schematic diagram illustrating a system 100 where embodiments presented herein can be applied. The system 100 comprises a transmitter 110 and a receiver 130 operatively connected to each other by a network 120. The network 120 might be wired, wireless, or partly wired and partly wireless.

Aspects of the transmitter no will be disclosed next. The transmitter 110 comprises a camera device 112. The camera device 112 is configured to capture image frames. In some examples the camera device 112 is a digital camera device and/or capable of pan, tilt and zoom (PTZ) and can thus be regarded as a (digital) PTZ camera device. Further, the transmitter no is configured to encode the images such that it can be decoded using any known video coding standard, such as any of: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

In this respect, the encoding might be performed either directly in conjunction with the camera device 112 capturing the image frames or at another entity, such as in a first video processing unit 116, and then, at least temporarily, stored in a database 122. The first video processing unit 116 is configured to provide digital signatures to a video stream, as will be further disclosed below. The camera device 112 and the video processing unit 116 are operatively connected to the network 120 via a first interface entity 114.

Aspects of the receiver 130 will be disclosed next. The receiver 130 comprises a second video processing unit 134. The second video processing unit 134 is configured to validate digital signatures of a video stream, as will be further disclosed below. The second video processing unit 134 is operatively connected to the network 120 via a second interface entity 132. Further, the receiver 130 is, via the second interface entity 132, operatively connected to a user interface device 140 with which a user 150 can interact. In some examples the user interface device 140 is a display device, such as a computer monitor, or screen, or a television device. In other examples, the user interface device 140 is a handheld portable device, such as a laptop computer, a tablet computer, or a mobile phone (also referred to as user equipment).

Assume that a video stream produced by the camera device 112 is to be transmitted from the transmitter no to the receiver 130 for display at the user interface device 140. In some scenarios it could be advantageous to enable the receiver 130 to verify authenticity of the video stream. One way to accomplish this is to implement a signing procedure at the transmitter no.

An example of a signing procedure will be disclosed next.

Assume that the transmitter no has produced a video stream composed of encoded image frames I0, P00, P01, P02, I1, P10, P11, P12, 12, . . . , where I0, I1, and I2 are so-called I-frames and where P00, P01, P02, P10, P11, P12 are so-called P-frames. I0, P00, P01, and P02 represent a first GOP, and I1, P10, P11, P12 represent a second GOP. The signing procedure can then be implemented by for each GOP performing the following.

First, each encoded image frame is hashed. In general terms, hashing an encoded image frame, or any piece of data, involves transforming the encoded image frame into another value, typically using a hash function. In this respect, a hash function is any function that can be used to map data of arbitrary size to fixed-size values. The values returned by the hash function are called hash values, hash codes, digests, or simply hashes. The values are usually used to index a fixed-size table called a hash table. Non-limiting examples of hash functions are SHA, e.g. SHA265, and MD5. The individual hashes of the encoded image frames in the GOP are then collected in a hash list $HL_i$ for GOP i. Denote by h(x) the hash of some data x. Thus, the hash list $HL_1$ for the first GOP is formed as:

$HL_1 = h(I0), h(P00), h(P01), h(P02)$

Similarly, the hash list $HL_2$ for the second GOP is formed as:

$HL_2 = h(I1), h(P10), h(P11), h(P12)$

Optionally, also the hash of the next coming I-frame is included in the hash lists. That is, also the hash h(I1) might be included in $HL_1$. In this respect, the hash of the next coming I-frame is not needed to detect if an encoded image frame has been modified or not, but can be used to detect if the entire GOP has been moved, or even removed.

Optionally, each hash list $HL_i$ is replaced by its own hash. That is, $HL_i$ can be replaced by $h(HL_i)$. The hash list $HL_i$ or the hash $h(HL_i)$, can then be added to, for example, a supplemental information unit (SIU) for GOP i. A SIU should in this disclosure be understood as a unit or message configured to comprise supplemental information about, or relating to, the encoded video sequence. The SIU might, for example, be a Supplemental Enhancement Information (SEI) message in the H.26x encoding format, or a Metadata Open Bitstream Unit (OBU) in the AV1 encoding format.

The hash list $HL_i$ or the hash $h(HL_i)$, and possible other metadata for the GOP, are then encrypted to form a digital signature. Hence, one digital signature per GOP is generated. The digital signature for GOP i is then added to the SEI frame for GOP i.

The above disclosed signing procedure only applies to video streams composed of a single layer (thus also considered as layer-less video streams). However, some of the above-mentioned video codecs, such as H265, have the possibility to produce scalable video streams. This means that the camera device 112 is configured to produce a full-scale video split into two or more layers, and also configured to select how many of these layers that will be transmitted. Hence, if a video stream is processed according to the procedure in example above, only full-scale video streams (i.e., video streams having all the layers produced by the camera device 112) can be validated by the receiver 130.

Figure 2:
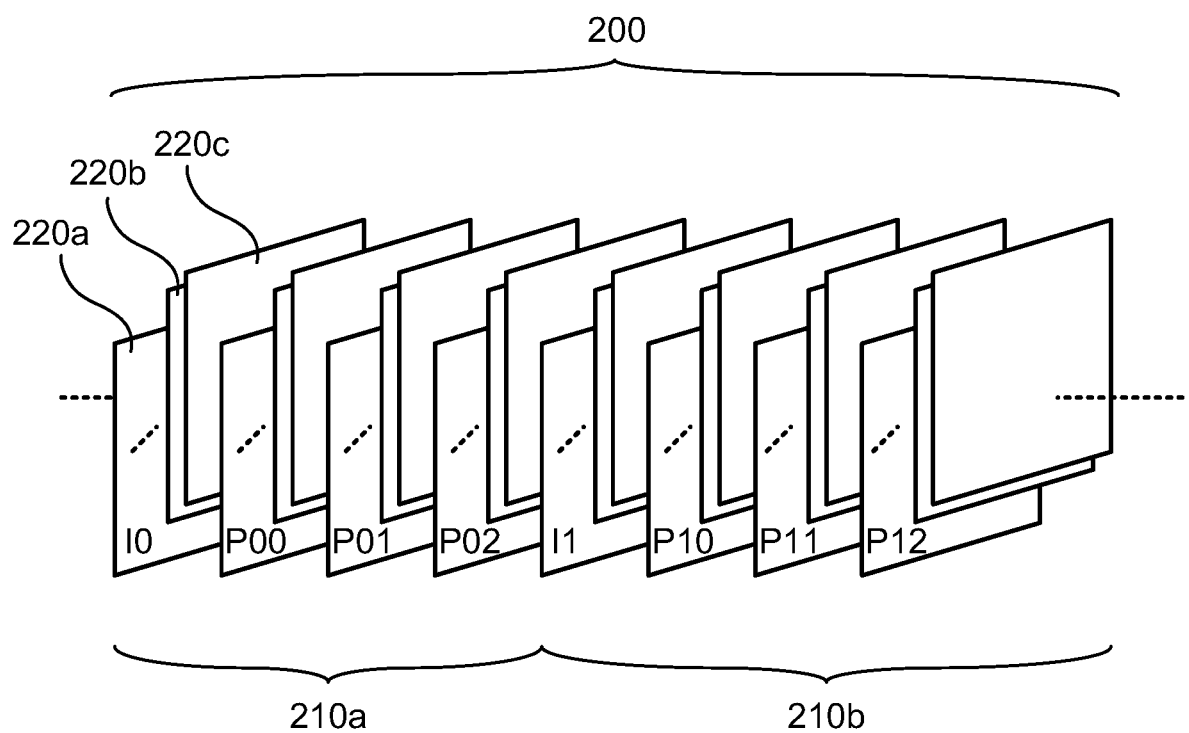
FIG. 2 is a schematic illustration of a sequence of encoded image frames in a video stream according to embodiments.

FIG. 2 schematically illustrates a video stream 200 according to an embodiment. The video stream 200 is encoded in K layers, from layer k=0 to layer K−1. Each of the K layers is composed of encoded image frames, three of which are identified at reference numerals 220a, 220b, 220c. In the illustrative example of FIG. 2, the video stream 200 is composed of two GOPs 210a, 210b. The first GOP 210a is composed of layered encoded image frames I0, I0-1, I0-2, P00, P00-1, P00-2, P01, P01-1, P01-2, P02, P02-1, P02-2. The second GOP 210b is composed of encoded image frames I1, I1-1, I1-2, P10, P10-1, P10-2, P11, P11-1, P11-2, P12, P12-1, P12-2.

In this respect, the encoded image frames I0, P00, P01, P02, I1, P10, P11, P12 represent one layer, the encoded image frames I0-1, P00-1, P01-1, P02-1, I1-1, P10-1, P11-1, P12-1 represent another layer, and the encoded image frames I0-2, P00-2, P01-2, P02-2, I1-2, P10-2, P11-2, P12-2 represent yet another layer. In general terms, the video stream 200 can be encoded in K layers, from layer k=0 to layer k=K−1. Thus, in the illustrative example of FIG. 2, K=3. The encoded image frame 220a represents an encoded image frame at layer k=0, the encoded image frame 220b represents an encoded image frame at layer k=1, and the encoded image frame 220c represents an encoded image frame at layer k=2.

In some non-limiting examples, layer k=0 is a base layer, and each of the layers k=1, . . . , K−1 is a respective enhancement layer. An enhancement layer might be dependent only on the base layer, or on an intermediate enhancement layer. That is, if there are K=3 layers, layer k=2 might be dependent on the base layer (i.e., on layer k=0) or the first enhancement layer (i.e., on layer k=1).

In many applications, scalable video is used to, based on one single encoding instance, distribute the same content to multiple users 150 having different requirements and conditions. One typical example is a broadcast scenario where the type of user interface device 140 might differ between different users 150.

In such scenarios the camera device 112 might produce a multi-layered video stream, where, for example a relay device in the network 120, manages which layers to transmit towards which user interface devices 140. Without loss of generality, it will hereinafter be assumed that the transmitter 110 has knowledge on which layers are received by the receiver 130.

One object is to enable a video stream composed of several layers to be validated by the receiver 130, independently of how many of the layers that the receiver 130 receives. Another object is to enable a video stream composed of several layers to be validated by the receiver 130 even when different layers in the video stream are successively removed over time.

Figure 3:
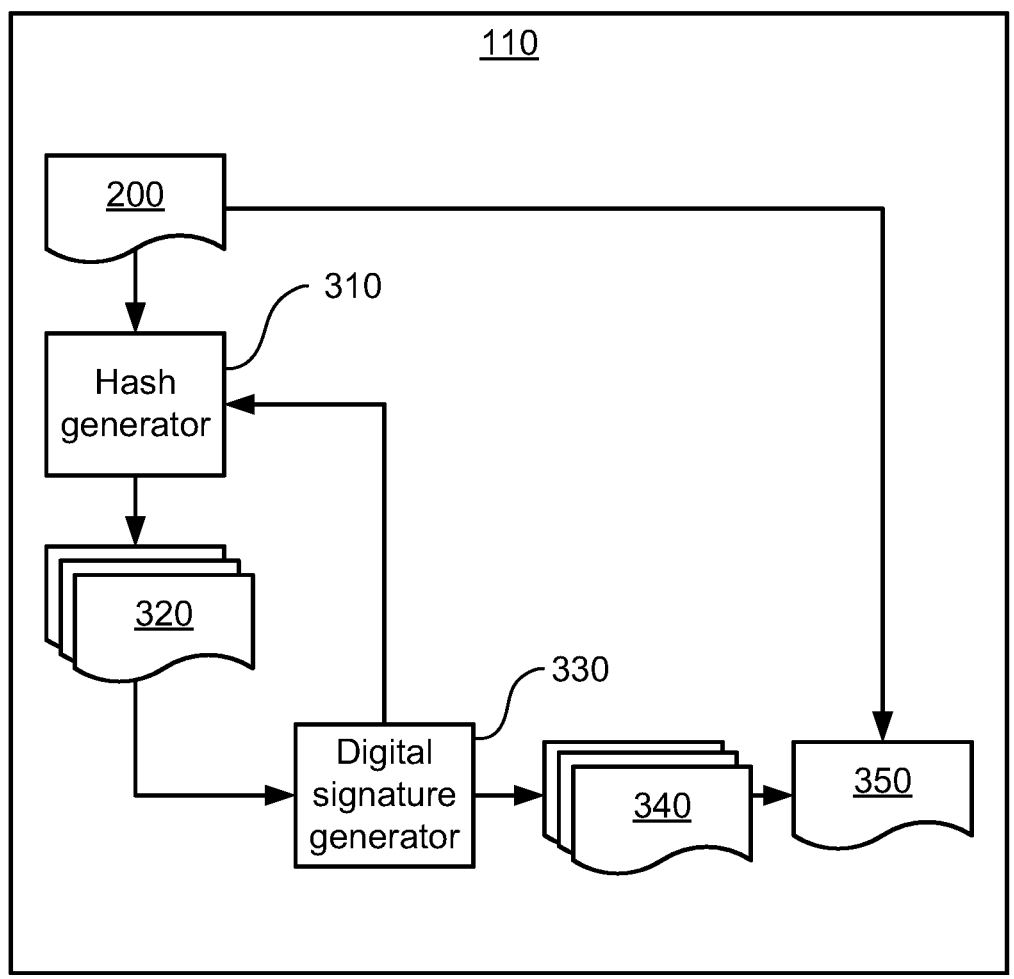
FIG. 3 is a block diagram of a transmitter according to embodiments.
Figure 4:
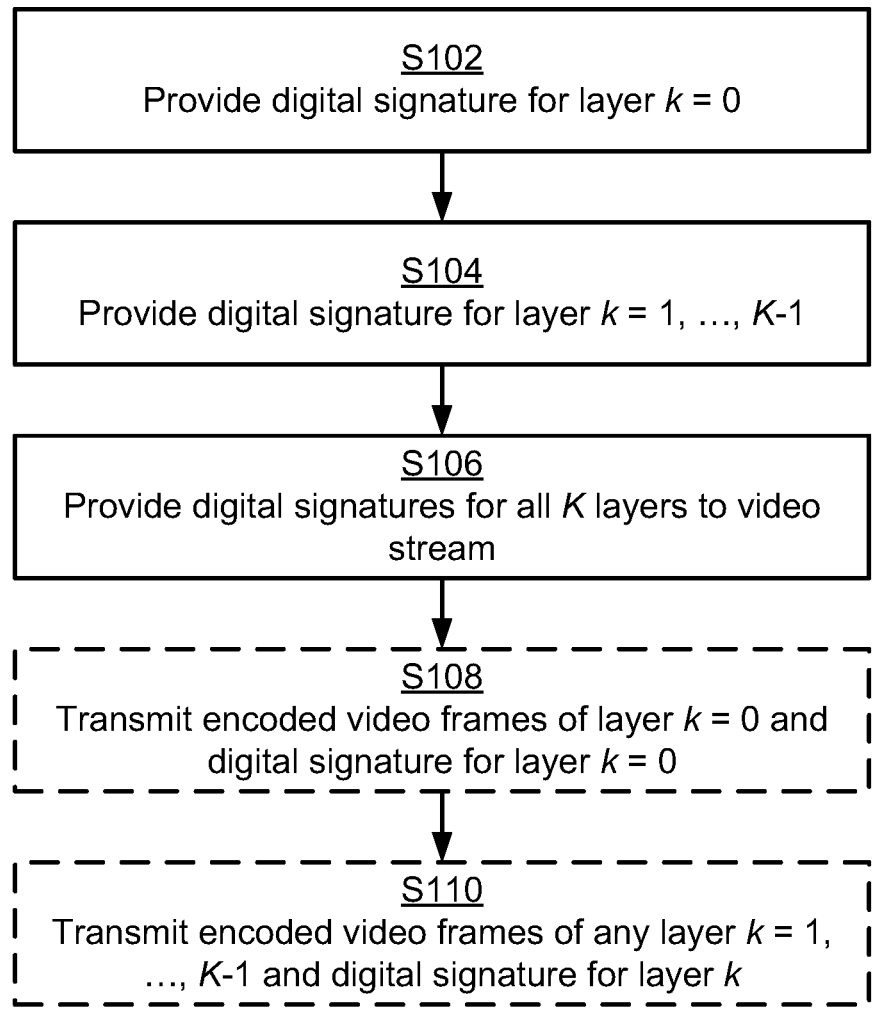
FIG. 4 and FIG. 6 are flowcharts of methods according to embodiments.

A method for providing digital signatures 340 to a video stream 200 as performed by the transmitter 110 will now be disclosed with parallel reference to FIG. 3 and FIG. 4. In FIG. 3 is illustrated a block diagram of a transmitter 110. In FIG. 4 is provided a flowchart of a method performed by the transmitter 110. As in FIG. 2, the video stream 200 is encoded in layers k=0, . . . , K−1. Each of the K layers is composed of encoded image frames 220a, 220b, 220c.

The digital signature for layer k=0 is provided as in step S102.

S102: The transmitter no provides a digital signature for layer k=0. The transmitter no first generates signing data 320 for layer k=0. In turn, the signing data 320 is generated by the transmitter no hashing the encoded image frames 220a of layer k=0. For the example in FIG. 2, the signing data $SD0_i$ for GOP i for the layer 0 will thus be based on the encoded image frames I0, P00, P01, P02, and I1. In FIG. 3 the signing data 320 is generated by a hash generator 310. Further aspects of the signing data 320 will be disclosed below. The transmitter no then generates the digital signature 340 for layer k=0 by encrypting the signing data 320, or a hash thereof, for layer k=0 with a private key of the private-public key pair. That is, either the signing data 320 for layer k=0 or a hash of the signing data 320 for layer k=0 is encrypted with the private key of the private-public key pair. For generating the digital signature 340 the transmitter no therefore has access to a private-public key pair. The digital signature $S0_i$ for GOP i for layer 0 will thus be either $S0_i=(SD00)_e$ or $S0_i=(h(SD0_i))_e$, where $(y)_e$ denotes that the data y has been encrypted with the private key of the private-public key pair.

The digital signature for each of the remaining layers k=1, . . . , K−1 is provided as in step S104.

S104: The transmitter no first generates signing data 320 for layer k by hashing the encoded image frames 220b, 220c of layer k and a link to any layer k=0 to layer k−1 on which layer k is dependent. That is, the encoded image frames 220b, 220c of layer k and the link to any layer k=0 to layer k−1 on which layer k is dependent are hashed. For the example in FIG. 2, the signing data $SDk_i$ for GOP i for layer k will thus be based on the encoded image frames I0-k, P00-k, P01-k, P02-k, and I1-k and the link to any layer k=0 to layer k−1 on which layer k is dependent. One example of how to include the link is to first hash the digital signature for the layer on which layer k is dependent and then add this hash to the hash list for layer k.

The transmitter 110 then generates the digital signature 340 for layer k by encrypting the signing data 320, or a hash thereof, for layer k with the private key of the private-public key pair. That is, either the signing data 320 for layer k or a hash of the signing data 320 for layer k is encrypted with the private key of the private-public key pair. The digital signature $Sk_i$ for GOP i for layer k will thus be either $Sk_i=(SDk_i)_e$ or $Sk_i=(h(SDk_i))_e$.

Step S104 is thus performed for each of the remaining layers k=1, . . . , K−1. In general terms, the digital signature for layer k=1, . . . , K−1 includes a link to layer k=0, or any other previous layer, on which layer k is dependent. In this respect, there might be different links from layer k to any previous layer k=0 to layer k−1. In some embodiments, the link to any layer k=0 to layer k−1 is any of: (i) the digital signature 340 of any layer k=0 to layer k−1, (ii) the signing data 320 for any layer k=0 to layer k−1, (iii) a hash of the digital signature 340 of any layer k=0 to layer k−1, (iv) a hash of the signing data 320 for any layer k=0 to layer k−1.

In FIG. 3, all digital signatures 340 (i.e., one digital signature 340 per each of the K layers) are generated by a digital signature generator 330.

S106: The transmitter 110 provides the digital signatures 340 for all the K layers to the video stream 200.

In some embodiments, one digital signature 340 for each of the K layers is generated per each GOP 210a, 210b. The aforementioned video stream 200 in FIG. 2 might thus schematically be represented as:

I0 I0-1 I0-2 P00 P00-1 P00-2 P01 P01-1 P01-2 P02 P02-1 P02-2 S0 S0-1 S0-2 I0 I1-1 I1-2 P10 P10-1 P10-2 P11 P11-1 P11-2 P12 P12-1 P12-2 S1 S1-1 S1-2 I2 I2-1 I2-2 P20 P20-1 P20-2 P21 P21-1 P21-2 P22 P22-1 P22-2 S2 S2-1 S2-2 I3 I3-1 I3-2.

In the illustrative example of FIG. 3, the digital signatures 340 for all the K layers are provided in at least one SIU 350, of the video stream 200. However, the digital signatures 340 might also be provided in another way to the video stream 200. For example, in some embodiments, all the K digital signatures 340 are provided in a digital signature bundle at layer k=0.

In some examples, also the signing data 320 is provided to the video stream 200. The signing data 320 might to the video stream 200 be provided together with the digital signatures 340.

As disclosed above, the signing data 320 for layer k=0 is generated by the transmitter 110 hashing the encoded image frames 220a of layer k=0, and the signing data 320 for layer k is generated by hashing the encoded image frames 220b, 220c of layer k and a link to any layer k=0 to layer k−1 on which layer k is dependent. There could be different examples according to which the signing data 320 is represented. For example, the signing data 320 for layer k=0, . . . , K−1 might be either a hash list of all hashed encoded image frames 220a, 220b, 220c of layer k or a hash of all the hashed encoded image frames 220a, 220b, 220c of layer k.

In some embodiments, each digital signature 340 is provided to its own layer in the video stream 200. Hence, in some embodiments, the signing data 320 for layer k=0, . . . , K−1 is provided to layer k in the video stream 200 when the digital signatures 340 for all the K layers are provided to the video stream 200.

In some examples, the encoded image frames 220a, 220b, 220c are provided in video sub-streams. There might be one such video sub-stream per each of the K layers.

The encoded image frames 220a, 220b, 220c per each of the K layers are then transmitted together with its digital signature 340. In particular, some embodiments, the transmitter 110 is configured to perform (optional) step S108:

S108: The transmitter 110 transmits the encoded image frames 220a of layer k=0 and the digital signature 340 for layer k=0 in video sub-stream k=0.

Thus, transmitting only the base layer (i.e., layer k=0) would thus be equal to transmitting:

I0 P00 P01 P02 S0 I1 P10 P11 P12 S1 I2 P20 P21 P22 S2 I3.

Further, also the encoded image frames 220*b*, 220*c* of any layer k=1, . . . , K−1 might be transmitted in a video sub-stream digital signature 340. Hence, in some embodiments, the transmitter 110 is configured to perform (optional) step S110:

S110: The transmitter 110 transmits the encoded image frames 220*b*, 220*c* of any layer k=1, . . . , K−1 and the digital signature 340 for layer k in video sub-stream k.

For example, transmitting the first enhancement layer (i.e., layer k=1) would thus be equal to transmitting:

I0-1 P00-1 P01-1 P02-1 S0-1 I1-1 P10-1 P11-1 P12-1 S1-1 I2-1 P20-1 P21-1 P22-1 S2-1 I3-1.

Figure 5:
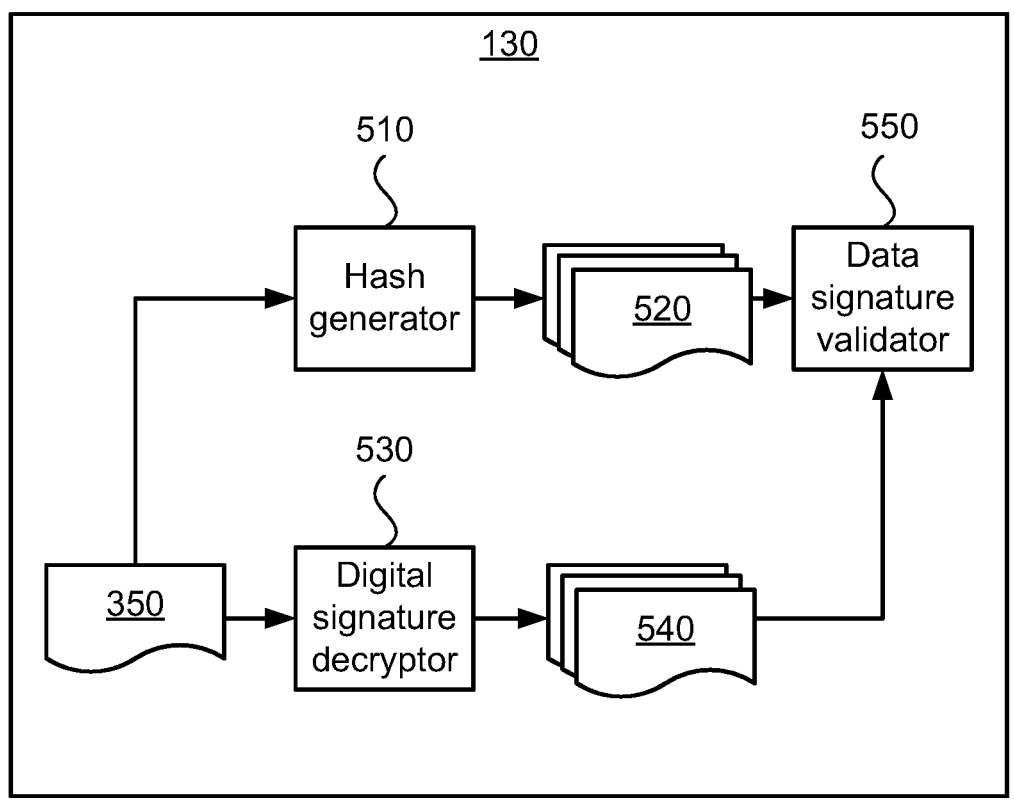
FIG. 5 is a block diagram of a receiver according to embodiments.
Figure 6:
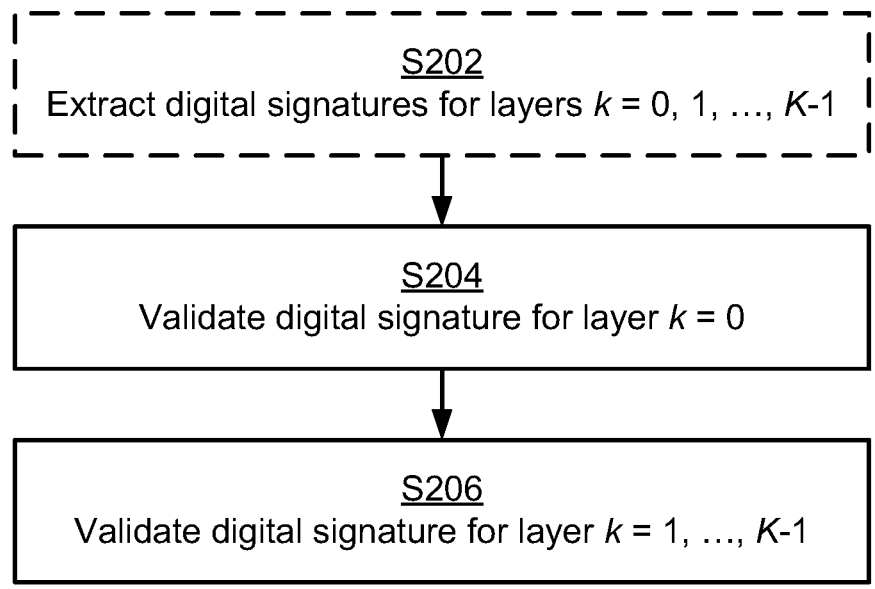

A method for validating digital signatures 340 of a video stream 200 as performed by the receiver 130 will now be disclosed with parallel reference to FIG. 5 and FIG. 6. In FIG. 5 is illustrated a block diagram of a receiver 130. In FIG. 6 is provided a flowchart of a method performed by the receiver 130. It is assumed that the digital signatures 340 have been provided to the video stream 200 by the transmitter 110 as disclosed above with reference to FIG. 3 and FIG. 4. Thus, as disclosed above, the video stream 200 is encoded in layers k=0, . . . , K−1. As further disclosed above, each of the K layers is composed of encoded image frames 220*a*, 220*b*, 220*c*.

In some embodiments, all the K digital signatures 340 are provided in a digital signature bundle at layer k=0. Then, the digital signatures 340 for layers k=0, 1, . . . , K−1 are extracted from the digital signature bundle before the digital signature 340 can be validated. Hence, in some embodiments, the receiver 130 is configured to perform (optional) step S202.

S202: The receiver 130 extracts the digital signatures 340 for layers k=0, 1, . . . , K−1 from the digital signature bundle.

The receiver 130 validates the digital signature 340 for layer k=0 as in step S204. In this respect, for layer k=0 the following encoded image frames are of interest:

I0 P00 Pi P02 S0 I1 P10 P11 P12 S1 I2 P20 P21 P22 S2 I3.

S204: The receiver 130 validates the digital signature 340 for layer k=0 by verifying that signing data 520 of the encoded image frames 220*a* of layer k=0 matches the decrypted digital signature 540 for layer k=0. In FIG. 5 the validation is made in the data signature validator 550. Hence, first the digital signature 540 is decrypted (as in the digital signature decryptor 530) and then the decrypted digital signature 540 is compared to signing data 520 as generated by the receiver 130 (as in the hash generator 510). The decrypted digital signature 540 is successfully validated only when the comparison gives that the decrypted digital signature 540 is equal to the signing data 520. In general terms, the signing data 520 can be used if the verification of the decrypted digital signature fails, particularly if the signing data is a hash list (and not a hash of a hash list). The digital signature can then be verified against the received signing data 520. If this verification is successful, then hashes in the hash lists can be compared to identify one or more errors. Further aspects of the signing data 520 will be disclosed below. The decrypted digital signature 540 for layer k=0 is decrypted from the digital signature 340 for layer k=0 using the public key of the private-public key pair of the transmitter 110. The receiver 130 therefore has access to this public key.

The receiver 130 validates the digital signature 340 for layer k=1, . . . , K−1 as in step S206. As an example, for layer k=1 the following encoded image frames are of interest:

I0-1 P00-1 P01-1 P02-1 S0 S0-1 I1-1 P10-1 P11-1 P12-1 S1 S1-1 I2-1 P20-1 P21-1 P22-1 S2 S2-1 I3-1.

S206: The receiver 130 validates a respective digital signature 340 for layer k=1, . . . , K−1 by, for layer k=1, . . . , K−1, verifying that signing data 520 of the encoded image frames 220*b*, 220*c* of layer k and a link to any layer k=0 to layer k−1 on which layer k is dependent matches a decrypted digital signature 540 for layer k. In FIG. 5 the validation is made in the data signature validator 550. Hence, first the digital signature 540 for layer k=1, . . . , K−1 is decrypted (as in the digital signature decryptor 530) and then the decrypted digital signature 540 for layer k=1, . . . , K−1 is compared to signing data 520 as generated by the receiver 130 (as in the hash generator 510) for layer k=1, . . . , K−1. The decrypted digital signature 540 is successfully validated for layer k=1, . . . , K−1 only when the comparison for layer k=1, . . . , K−1 gives that the decrypted digital signature 540 is equal to the signing data 520.

In the same manner as disclosed above, the signing data 520 for layer k=0 is generated by the receiver 130 hashing the encoded image frames 220*a* of layer k=0, and the signing data 520 for layer k is generated by hashing the encoded image frames 220*b*, 220*c* of layer k and a link to any layer k=0 to layer k−1 on which layer k is dependent. In the same manner as disclosed above, there could be different examples according to which the signing data 520 is represented. For example, the signing data 520 for layer k=0, . . . , K−1 might be either a hash list of all hashed encoded image frames 220*a*, 220*b*, 220*c* of layer k or a hash of all the hashed encoded image frames 220*a*, 220*b*, 220*c* of layer k.

As disclosed above, there might be different links from layer k to any previous layer k=0 to layer k−1. In some embodiments, and in accordance with what has been disclosed above with reference to FIG. 3 and FIG. 4, the link to any layer k=0 to layer k−1 is any of: (i) the digital signature 340 of any layer k=0 to layer k−1, (ii) the signing data 320, generated by the transmitter 110, of the encoded image frames 220*a*, 220*b* for any layer k=0 to layer k−1, (iii) the signing data 320, generated by the transmitter 110, of the digital signature of any layer k=0 to layer k−1, (iv) a hash of the signing data 320 for any layer k=0 to layer k−1, generated by the transmitter 110.

The decrypted digital signature 540 for layer k is decrypted from the digital signature 340 for layer k using the public key.

Step S206 needs only to be performed for the layers of interest. Hence, if there are K=3 layers but only layers k=0, 1 are of interest, then step S206 needs not to be performed for layer k=2.

As disclosed above, in some examples, the digital signatures 340 for all the K layers are provided in at least one SIU 350, of the video stream 200.

Figure 7:
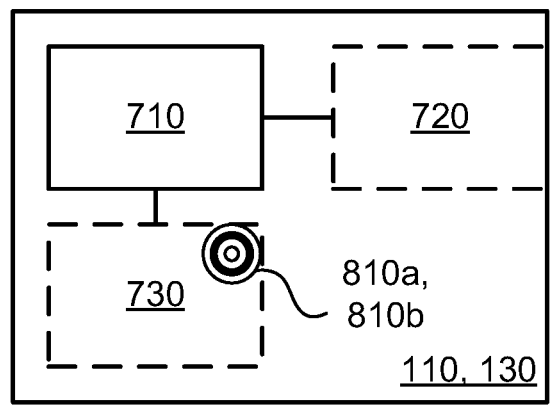
FIG. 7 is a schematic diagram showing functional units of a transmitter/receiver device according to an embodiment.

FIG. 7 schematically illustrates, in terms of a number of functional units, the components of a transmitter/receiver device 110, 130 according to an embodiment. The transmitter/receiver device 110, 130 implements the functionality of either only the transmitter 110, or only the receiver 130, or both the transmitter 110 and the receiver 130. Processing circuitry 710 is provided using any combination of one or more of a suitable central processing unit (CPU), multiprocessor, microcontroller, digital signal processor (DSP), etc., capable of executing software instructions stored in a computer program product 810*a*, 810*b* (as in FIG. 8), e.g. in the form of a storage medium 730. The processing circuitry 710 may further be provided as at least one application specific integrated circuit (ASIC), or field programmable gate array (FPGA).

Particularly, the processing circuitry 710 is configured to cause the transmitter/receiver device 110, 130 to perform a set of operations, or steps, as disclosed above. For example, the storage medium 730 may store the set of operations, and the processing circuitry 710 may be configured to retrieve the set of operations from the storage medium 730 to cause the transmitter/receiver device 110, 130 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The transmitter/receiver device 110, 130 may further comprise a communications interface 720 for communications with other entities, functions, nodes, and devices, as in FIG. 1. As such the communications interface 720 may comprise one or more transmitters and receivers, comprising analogue and digital components.

The processing circuitry 710 controls the general operation of the transmitter/receiver device 110, 130 e.g. by sending data and control signals to the communications interface 720 and the storage medium 730, by receiving data and reports from the communications interface 720, and by retrieving data and instructions from the storage medium 730. Other components, as well as the related functionality, of the transmitter/receiver device 110, 130 are omitted in order not to obscure the concepts presented herein.

The transmitter/receiver device 110, 130 may be provided as a standalone device or as a part of at least one further device. Thus, a first portion of the instructions performed by the transmitter/receiver device 110, 130 may be executed in a first device, and a second portion of the instructions performed by the transmitter/receiver device 110, 130 may be executed in a second device; the herein disclosed embodiments are not limited to any particular number of devices on which the instructions performed by the transmitter/receiver device 110, 130 may be executed. Hence, the methods according to the herein disclosed embodiments are suitable to be performed by a transmitter/receiver device 110, 130 residing in a cloud computational environment. Therefore, although a single processing circuitry 710 is illustrated in FIG. 7 the processing circuitry 710 may be distributed among a plurality of devices, or nodes. The same applies to the computer programs 820a, 820 of FIG. 8.

Figure 8:
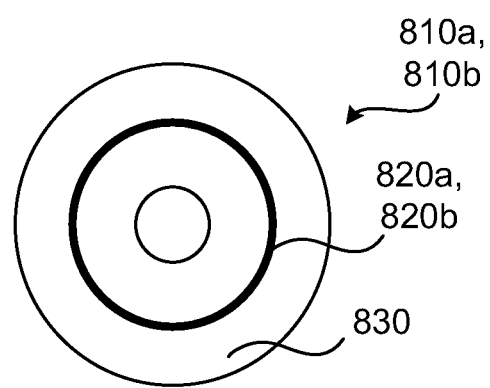
FIG. 8 shows one example of a computer program product comprising computer readable means according to an embodiment.

FIG. 8 shows one example of a computer program product 810a, 810b comprising computer readable means 830. On this computer readable means 830, a computer program 820a, 820b can be stored, which computer program 820a, 820b can cause the processing circuitry 710 and thereto operatively coupled entities and devices, such as the communications interface 720 and the storage medium 730, to execute methods according to embodiments described herein. The computer program 820a, 820b and/or computer program product 810a, 810b may thus provide means for performing any steps of the transmitter/receiver device no, 130 as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for providing digital signatures to a video stream encoded in layers k=0, . . . , K−1, wherein each of the K layers comprises encoded image frames, the method being performed by a transmitter wherein the transmitter has access to a private-public key pair, and wherein the method comprises:
    providing a digital signature for a base layer 0 by:
        generating signing data for the base layer 0 by hashing the encoded image frames of the base layer 0; and
        generating the digital signature for the base layer 0 by encrypting the signing data, or a hash thereof, for the base layer 0 with a private key of the private-public key pair;
    providing a respective digital signature for each enhancement layer k=1, . . . , K−1 by, for each enhancement layer k=1, . . . , K−1:
        generating signing data for the enhancement layer k by hashing the encoded image frames of the enhancement layer k and a link to the base layer 0 or any other previous layer 1 to k−1 on which the enhancement layer k is dependent, wherein the link is the digital signature of said base layer 0 or said any other previous layer 1 to k−1; and
        generating the digital signature for the enhancement layer k by encrypting the signing data, or a hash thereof, for the enhancement layer k with the private key of the private-public key pair; and
    providing the respective digital signatures for each layer k=0, . . . , K−1 to its own layer k=0, . . . , K−1 in the video stream.

2. The method according to claim 1, wherein the signing data for layer k=0, . . . , K−1 is either a hash list of all hashed encoded image frames of layer k or a hash of all the hashed encoded image frames of layer k.

3. The method according to claim 1, wherein the video stream comprises at least one group of pictures, GOP, and wherein one digital signature for each of the K layers is generated per each GOP.

4. The method according to claim 1, wherein the method further comprises:
    transmitting the encoded image frames of layer k=0 and the digital signature for layer k=0 in video sub-stream k=0.

5. The method according to claim 1, wherein the any other previous layer 1 to k−1 comprises one or more intermediate enhancement layers.

6. A method for validating digital signatures of a video stream encoded in layers k=0, . . . , K−1, wherein each of the K layers comprises encoded image frames, wherein the method is performed by a receiver, wherein the receiver has access to a public key of a private-public key pair of a transmitter, and wherein the method comprises:
    validating a digital signature for a base layer 0 by verifying that signing data of the encoded image frames of the base layer 0 matches a decrypted digital signature for the base layer 0, the decrypted digital signature for the base layer 0 being decrypted from the digital signature for the base layer 0 using the public key; and validating a respective digital signature for the enhancement layer k=1, ..., K−1 by, for the enhancement layer k=1, ..., K−1, verifying that signing data of the encoded image frames of the enhancement layer k and a link to the base layer 0 or to any other previous layer 1 to k−1 on which the enhancement layer k is dependent matches a decrypted digital signature for the enhancement layer k, the decrypted digital signature for the enhancement layer k being decrypted from the digital signature for the enhancement layer k using the public key, wherein the link is the digital signature of said base layer 0 or said any other previous layer 1 to k−1; and wherein the respective digital signature for each layer k=0, ..., K−1 is provided to its own layer k=0, ..., K−1 in the video stream.

7. A transmitter for providing digital signatures to a video stream encoded in layers k=0, ..., K−1, wherein each of the K layers comprises encoded image frames, wherein the transmitter has access to a private-public key pair, the transmitter comprising processing circuitry, the processing circuitry being configured to cause the transmitter to:

provide a digital signature for a base layer 0 by:
generating signing data for the base layer 0 by hashing the encoded image frames of the base layer 0; and
generating the digital signature for the base layer 0 by encrypting the signing data, or a hash thereof, for the base layer 0 with a private key of the private-public key pair;

provide a respective digital signature for each enhancement layer k=1, ..., K−1 by, for each enhancement layer k=1, ..., K−1:
generating signing data for the enhancement layer k by hashing the encoded image frames of the enhancement layer k and a link to the base layer 0 or to another other previous layer 1 to k−1 on which enhancement layer k is dependent, wherein the link is the digital signature of said base layer 0 or said any other previous layer 1 to k−1; and
generating the digital signature for the enhancement layer k by encrypting the signing data, or a hash thereof, for the enhancement layer k with the private key of the private-public key pair; and provide the respective digital signatures for each layer k=0, ..., K−1, to its own layer k=0, ..., K−1, in the video stream.

8. A receiver for validating digital signatures of a video stream encoded in layers k=0, ..., K−1, wherein each of the K layers comprises encoded image frames, wherein the receiver has access to a public key of a private-public key pair of a transmitter, the receiver comprising processing circuitry, the processing circuitry being configured to cause the receiver to:

validate a digital signature for a base layer 0 by verifying that signing data of the encoded image frames of the base layer 0 matches a decrypted digital signature for the base layer 0, the decrypted digital signature for the base layer 0 being decrypted from the digital signature for the base layer 0 using the public key; and validate a respective digital signature for an enhancement layer k=1, ..., K−1 by, for the enhancement layer k=1, ..., K−1, verifying that signing data of the encoded image frames of the enhancement layer k and a link to the base layer 0 or to any other previous layer 1 to k−1 on which the enhancement layer k is dependent matches a decrypted digital signature for the enhancement layer k, the decrypted digital signature for the enhancement layer k being decrypted from the digital signature for the enhancement layer k using the public key, wherein the link is the digital signature of said base layer 0 or said any other previous layer 1 to k−1; and wherein the respective digital signature for each layer k=0, ..., K−1 is provided to its own layer k=0, ..., K−1 in the video stream.

9. A computer program for providing digital signatures to a video stream encoded in layers k=0, ..., K−1, wherein each of the K layers comprises encoded image frames, the computer program comprising computer code which, when run on processing circuitry of a transmitter having access to a private-public key pair, causes the transmitter to:

provide a digital signature for a base layer 0 by:
generating signing data for the base layer 0 by hashing the encoded image frames of the base layer 0; and
generating the digital signature for the base layer 0 by encrypting the signing data, or a hash thereof, for the base layer 0 with a private key of the private-public key pair;

provide a respective digital signature for each enhancement layer k=1, ..., K−1 by, for each enhancement layer k=1, ..., K−1:
generating signing data for the enhancement layer k by hashing the encoded image frames of the enhancement layer k and a link to the base layer 0 or to any other previous layer 1 to k−1 on which the enhancement layer k is dependent, wherein the link is the digital signature of said base layer 0 or said any other previous layer 1 to k−1; and
generating the digital signature for the enhancement layer k by encrypting the signing data, or a hash thereof, for the enhancement layer k with the private key of the private-public key pair; and provide the respective digital signatures for each layer k=1, ..., K−1 to its own layer k=1, ..., K−1 in the video stream.

10. A computer program for validating digital signatures of a video stream encoded in layers k=0, ..., K−1, wherein each of the K layers comprises encoded image frames, the computer program comprising computer code which, when run on processing circuitry of a receiver having access to a public key of a private-public key pair of a transmitter, causes the receiver to:

validate a digital signature for a base layer 0 by verifying that signing data of the encoded image frames of the base layer 0 matches a decrypted digital signature for the base layer 0, the decrypted digital signature for the base layer 0 being decrypted from the digital signature for the base layer 0 using the public key; and validate a respective digital signature for enhancement layer k=1, ..., K−1 by, for the enhancement layer k=1, ..., K−1, verifying that signing data of the encoded image frames of the enhancement layer k and a link to the base layer k 0 or any other previous layer 1 to k−1 on which the enhancement layer k is dependent matches a decrypted digital signature for the enhancement layer k, the decrypted digital signature for the enhancement layer k being decrypted from the digital signature for the enhancement layer k using the public key, wherein the link is the digital signature of said any base layer 0 or said any other previous layer 1 to k−1, and wherein each respective digital signature for each layer k=0, . . . , K−1 is provided to its own layer k=0, . . . , K−1 in the video stream.

\* \* \* \* \*